June 24, 1958 W. MANN ET AL 2,840,193
ROTOR BRAKE
Filed Jan. 25, 1955
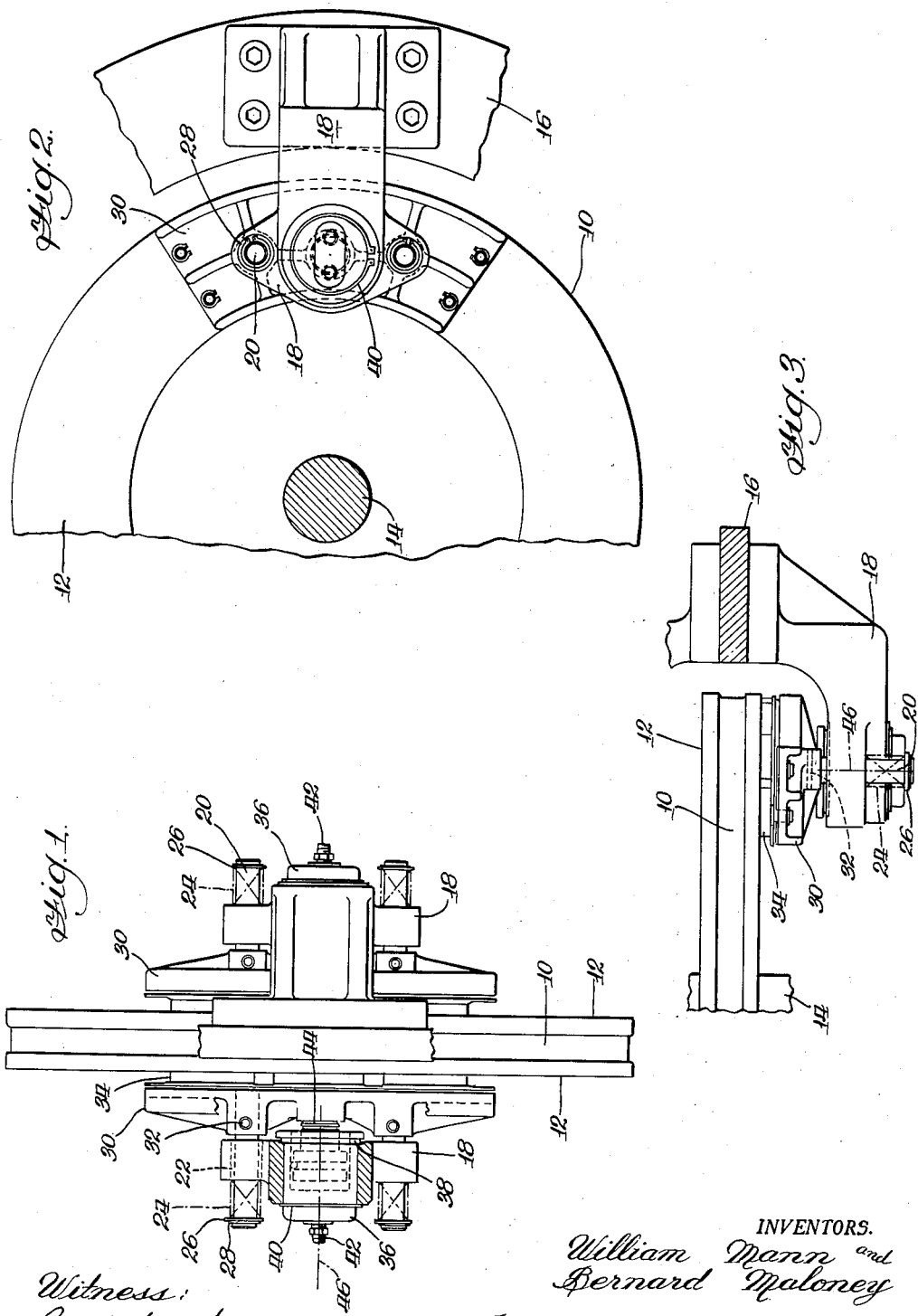
INVENTORS.
William Mann and
Bernard Maloney
By Walter L. Schlegel, Jr. Atty.
Witness:
Ralph Faust

United States Patent Office 2,840,193
Patented June 24, 1958

2,840,193
ROTOR BRAKE

William Mann and Bernard Maloney, Gary, Ind., assignors to American Steel Foundries, Chicago, Ill., a corporation of New Jersey Application January 25, 1955, Serial No. 483,914

2 Claims. (Cl. 188—73)

The invention relates to improvements in brakes and more particularly to an improved rotor brake arrangement.

The rotor brakes in use at the present time have several inherent disadvantages. The primary disadvantage is the difficulty in maintaining the brake head and brake shoe in parallel alignment with the rotor so that equal brake shoe wear will occur. Attempts have been made to overcome this difficulty through the use of various types of brackets, or guides, for the brake head, but these methods greatly increase the fabricating costs and also tend to decrease the operating efficiency of the brake. Another disadvantage to existing brake arrangements is the complicated system of actuating levers which transmit an arcuate motion to the brake head, which must be overcome by additional linkages or guides.

One of the objects of this invention is to provide a rotor brake which inherently will accommodate equal brake shoe wear.

Another object is to provide a rotor brake wherein the brake shoe is held parallel to the rotor without the use of compensating brackets, levers or guides, thereby greatly decreasing the costs of fabrication and maintenance.

Another object is to provide a rotor brake with a simplified actuating mechanism mounted directly behind the brake heads whereby the usual brake linkages are eliminated.

Still another object of the invention is to provide a compact disk type brake applicable to any of the various classes of equipment wherein braking of a rotating part such as an axle shaft or rod is required. Other objects and advantages will become apparent from the following description taken in conjunction with the drawings, in which:

Figure 1 is an elevational view of the preferred embodiment of the invention, partially in section;

Figure 2 is a side view of the device shown in Figure 1 with some of the parts broken away; and Figure 3 is a half sectional plan view showing only the structure on one side of the rotor.

Referring to the drawings, a rotor or disk 10 is rigidly attached for rotation therewith to a rotating member 14, which may be an axle of a truck or railroad car, or a shaft or rod of various types of industrial machinery. The rotor 10 is provided with friction surfaces 12. A support member 16 is fixed as desired to the frame of the vehicle or machine (not shown). Bolted or otherwise secured to the member 16 is provided a pair of brake arms 18, each arm extending to a position adjacent its respective friction surface. A pair of guide rods 20 are slidably disposed through bushed holes 22 in the arms 18. These rods are positioned so that their line of movement is normal to the friction faces. A spring 24 surrounds each of the guide rods and bears against a washer 26 which is maintained in the desired position by means of retaining ring 28. In assembly these springs are normally slightly compressed so that they constantly urge the guide rods in a direction axially outward or away from the friction surfaces of the rotor. Each pair of guide rods associated with one of the brake arms carries, for motion therewith, a brake head 30. The brake heads may be secured to the rods by means of tapered pins 32, or in any other desired manner. Brake shoes 34 are preferably resiliently mounted to the brake head 30, positioned for engagement with the friction surfaces of the rotor when desired. Centrally of the brake head and preferably midway between the guide rods, a hydraulic cylinder 36 passes through and is supported by brake arm 18. The cylinder is restrained from motion in one direction by a shoulder 38 and in the opposite direction by a retaining ring 40. Preferably the cylinder is air-actuated, but, of course, hydraulic fluid could be utilized.

The cylinder is connected by means of a conduit 42 to any conventional source of pressure fluid. The piston rod 44 of the hydraulic cylinder is directly connected to the brake head 30 so that any motion of the piston rod in response to fluid pressure in the cylinder will be transmitted directly to the brake member.

As clearly indicated in the drawings, the brake arm, brake head and actuating cylinder are disposed generally on a common center line 46 which extends through and normal to the friction faces of the rotor. Inasmuch as arms 18 are rigidly positioned, it is readily apparent that the shoe carrying brake heads are always maintained in parallel relationship with the rotor. This, of course, eliminates any possibility of uneven wear of the brake shoes, and accomplishes this desirable result with the barest minimum number of parts. Furthermore the rotor brakes presently in use have not proven simple enough or fool proof enough to be generally acceptable for the majority of industrial applications. The invention herein described overcomes these objections in that it cannot easily get out of order and the device is simple enough that practically no preliminary adjustments are required.

Though the preferred embodiment of the invention is illustrated in the drawings, there are many modifications which could be made without departing from the spirit of the invention. For example, whereas in the device shown the brake shoes are urged into engagement with the rotor by a fluid actuating cylinder and urged out of engagement when the fluid pressure is released by virtue of the constant outward pressure of the springs 24, it would be possible to utilize a double acting cylinder. In this case the springs 24 could be eliminated.

Another variation might be in the number of guide rods employed. It is apparent, however, that these modifications would not change the basic concept of the invention.

We claim:

1. A rotor brake comprising a brake rotor having two external side faces, said side faces serving as radial friction surfaces, two brake arms fixed adjacent to and spaced from said side faces, guide rods snugly and slidably mounted in bushings fixed in the brake arms, said guide rods and bushings having central axes disposed normal to the adjacent rotor side faces, segmental shoe carrying brake head means fixed to and supported by said guide rods for motion therewith and engageable with the rotor side faces, the coengaging surfaces of the bushings and guide rods being the sole means for transmitting torque from the head means to the arms and being formed and arranged to assure substantial parallelism between the segmental shoes and the adjacent rotor side faces, spring means sleeved on said rods to urge the segmental shoes out of contact with the rotor side faces, and fluid cylinder means operatively connected to and interposed between each of the brake arms and the corresponding brake head means.

2. A rotor brake comprising a brake rotor having two external side faces, said side faces serving as radial friction surfaces, two brake arms fixed adjacent to and spaced from said side faces, guide rods snugly and slidably mounted in the brake arms, said guide rods having central axes disposed normal to the adjacent rotor side faces, segmental shoe carrying brake head means fixed to and supported by said guide rods for motion therewith and engageable with the rotor side faces, the coengaging surfaces of the guide rods and the brake arms being the sole means for transmitting torque from the head means to the arms and being formed and arranged to assure substantial parallelism between the segmental shoes and the adjacent rotor side faces, spring means sleeved on said rods to urge the segmental shoes out of contact with the rotor side faces, and fluid cylinder means operatively connected to and interposed between each of the brake arms and the corresponding brake head means.

References Cited in the file of this patent

UNITED STATES PATENTS

| | | |
|---|---|---|
| 1,567,915 | Cole | Dec. 29, 1925 |
| 2,596,556 | Hollerith | May 13, 1952 |
| 2,655,229 | Eksergian | Oct. 13, 1952 |
| 2,754,936 | Butler | July 17, 1956 |

FOREIGN PATENTS

| | | |
|---|---|---|
| 706,050 | Great Britain | Mar. 24, 1954 |